(12) United States Patent
Hummel et al.

(10) Patent No.: US 9,361,538 B2
(45) Date of Patent: Jun. 7, 2016

(54) REAL TIME PHOTOMETRIC EDGE DESCRIPTION

(71) Applicant: Microsoft Technology Licensing, LLC, Redmond, WA (US)

(72) Inventors: Britta S. Hummel, Berkeley, CA (US); Oliver Williams, San Francisco, CA (US); Abdelrehim Ahmed, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 13/727,053

(22) Filed: Dec. 26, 2012

(65) Prior Publication Data

US 2014/0177956 A1 Jun. 26, 2014

(51) Int. Cl.
G06K 9/00 (2006.01)
G06K 9/46 (2006.01)
G06K 9/62 (2006.01)

(52) U.S. Cl.
CPC .............. *G06K 9/46* (2013.01); *G06K 9/4604* (2013.01); *G06K 9/4652* (2013.01); *G06K 9/6211* (2013.01)

(58) Field of Classification Search
None
See application file for complete search history.

(56) References Cited

U.S. PATENT DOCUMENTS

| 6,361,910 | B1* | 3/2002 | Sarig et al. ...................... 430/30 |
| 7,382,897 | B2 | 6/2008 | Brown et al. |
| 2005/0254727 | A1* | 11/2005 | Fedorovskaya ....... G06T 7/0002 382/286 |
| 2006/0259835 | A1* | 11/2006 | Marinissen et al. .......... 714/724 |
| 2009/0238460 | A1 | 9/2009 | Funayama et al. |
| 2011/0106782 | A1* | 5/2011 | Ke et al. ........................ 707/706 |
| 2011/0235922 | A1* | 9/2011 | Chertok et al. ............... 382/199 |
| 2011/0286631 | A1 | 11/2011 | Wagner et al. |
| 2012/0082385 | A1 | 4/2012 | Xu et al. |
| 2012/0242856 | A1* | 9/2012 | Tay .................... H04N 5/23212 348/222.1 |

FOREIGN PATENT DOCUMENTS

| EP | 1594078 A2 | 11/2005 |
| WO | 2009087340 A1 | 7/2009 |
| WO | 2011054002 A2 | 5/2011 |
| WO | 2012/115332 A1 | 8/2012 |

OTHER PUBLICATIONS

Calonder, et al., "BRIEF: Binary Robust Independent Elementary Features", ECCV'10 Proceedings of the 11th European conference on Computer vision: Part IV, pp. 778-792, retrieved on: Aug. 14, 2012, Available at: http://cvlab.epfl.ch/~lepetit/papers/calonder_eccv10.pdf.

Meltzer, et al., "Edge Descriptors for Robust Wide-Baseline Correspondence", In proceeding of Computer Vision and Pattern Recognition, Jun. 23, 2008, 8 pages.

(Continued)

*Primary Examiner* — Hadi Akhavannik
(74) *Attorney, Agent, or Firm* — Dan Choi; Judy Yee; Micky Minhas

(57) ABSTRACT

Systems and methods are disclosed for describing and tracking edges within the field of view of one or more imaging devices. In one example, the present system defines a row of pixels taken across a width of the edge, and then determines a binary edge descriptor for the edge by comparing at least one of grayscale values and contrast of pixels within respective pixel pairs from the row of pixels, the result of the comparisons setting bits within the binary descriptor.

20 Claims, 10 Drawing Sheets

(56) References Cited

OTHER PUBLICATIONS

Liu, et al., "I-BRIEF: A Fast Feature Point Descriptor with More Robust Features", In proceeding of Seventh International Conference on Signal Image Technology & Internet-Based Systems, Nov. 28, 2011, 7 pages.

"International Search Report & Written Opinion for PCT Application No. PCT/US2013/076693", Mailed Date: Mar. 20, 2014, Filed Date: Dec. 19, 2013, 9 Pages.

* cited by examiner

| Bit | Compare | Result |
|---|---|---|
| 0: | 38 > 17? | 0 |
| 1: | 6 > 30? | 0 |
| 2: | 14 > 1? | 1 |
| 3: | 14 > 40? | 1 |
| ... | | |
| 15: | 22 > 4? | 1 |

Fig. 9

| Bit | Compare To $g_t$ | Result |
|---|---|---|
| 16: | $|8 - 9| < g_t?$ | 0 |
| 17: | $|39 - 30| < g_t?$ | 1 |
| 18: | $|1 - 36| < g_t?$ | 0 |
| 19: | $|17 - 5| < g_t?$ | 1 |
| ... | | |
| 31: | $|1 - 5| < g_t?$ | 1 |

B = 32

0 0 1 1 1 1 1 0 0 0 1 0 0 0 0 0 1 0 1 0 1 0 0 1 0 1 0 0 1 1 0 0 1 0 1

Grayscale Ordering | Contrast Ordering

Fig. 10

- Estimated Edge Pose
- Search Lines
- • Local Maxima

REAL TIME PHOTOMETRIC EDGE DESCRIPTION

BACKGROUND

One area of computer vision is feature matching, where a feature in a field of view of one camera is tracked over time, or a feature in the field of view of multiple cameras is tracked at the same point in time. Finding the set of pixels representing a particular feature to be tracked, such as the corner of a book shelf, in different views of a scene is key to creating a 3d reconstruction of a scene. For corner features descriptor-based matching has proven vastly superior over previous approaches and a rich body of approaches exist (e.g. SIFT, SURF). More recent corner descriptors are capable to work in super real-time (e.g. BRIEF).

However, corner features and/or rich textures are oftentimes not present in the quantity required for 3d reconstruction in certain environments, such as for example a non-cluttered living room. Such environments often still do include long straight edge features. For example, a living room may include bookshelves, tables, ceilings and walls). For edge features, however, no robust and super real-time feature description or matching algorithm has been proposed yet.

SUMMARY

Embodiments of the present technology relate to systems and methods for describing and tracking edges within the field of view of one or more imaging devices. In a first aspect, the present technology describes an edge captured in a first image. The edge may be described by defining an offset patch of pixels taken in the direction of increasing grayscale gradient across the edge. In examples, the offset patch of pixels is a single row of a predetermined number of pixels.

A binary edge descriptor may next be defined as a concatenation of two substrings. A first substring of the binary edge descriptor may be defined by comparing grayscale values within respective pixel pairs within the offset patch. The second substring of the binary edge descriptor may be defined by comparing the contrast of respective pixel pairs within the offset patch. The result of the comparisons may be used to set the bits within the substrings of the binary descriptor.

After an edge descriptor is defined for an edge in an image, the same edge may be matched from a second image. This may be done by computing binary edge descriptors for points of interest on a proposed edge in the second image. The proposed edge in the second image may be confirmed or rejected as a match to the edge in the first image by comparing the binary edge descriptors for points of interest on the proposed edge in the second image with the edge descriptor defined for the first image. Given the composition of the binary edge descriptors, the generation and matching of the edge descriptors may accurately identify matches in two images in real time.

In a first example, the present technology relates to a photometric system for describing an edge within a field of view, comprising: an offset patch of pixels taken across a width of the edge, the patch having a single row of a predetermined number of pixels; and a binary edge descriptor determined by comparing pixel pairs within the offset patch under a predetermined rule, the result of the comparisons under the predetermined rule setting bits within the binary descriptor.

In a second example, the present technology relates to one or more processor readable storage devices having processor readable code embodied on said processor readable storage devices, said processor readable code for programming one or more processors of a computing environment to perform a method of describing an edge captured within a field of view of an imaging device, the method comprising: (a) determining a point of interest on the edge; (b) determining an orientation of the edge; (c) identifying a row of pixels through the point of interest and oriented across a width of the edge; (d) comparing properties of different pixel pairs within the row of pixels identified in the step (c); and (e) setting the bits of a binary descriptor based on the result of the comparisons performed in said step (d).

In a further example, the present technology relates to a method of matching an edge within first and second images, the method comprising: (a) describing the edge from the first image by the steps of: (i) defining an offset patch of pixels taken across a width of the edge, the patch having a single row of a predetermined number of pixels, and (ii) defining a binary edge descriptor by comparing at least one of grayscale values and contrast of pixels within respective pixel pairs within the offset patch, the result of the comparisons setting bits within the binary descriptor; and (b) matching the edge from the first image with the edge of the second image by the steps of: (i) computing binary edge descriptors for points of interest on a proposed edge in the second image, (ii) confirming the proposed edge in the second image as matching the edge in the first image where the Hamming distance between the edge descriptors for the points of interest on the proposed edge in the second image and the edge descriptor for the edge in the first image is below a predetermined value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is an illustration of an enlarged sample offset patch according to embodiments of the present system.

FIG. 8 is a table illustrating sample generation points in the edge descriptor bit string.

FIG. 9 is a further table illustrating sample generation points in the edge descriptor bit string.

FIG. 10 is a sample edge descriptor bit string according to embodiments of the present technology.

DETAILED DESCRIPTION

Embodiments of the present technology will now be described with reference to FIGS. 1-17, which in general relate to systems and methods for describing and tracking edges within the field of view of one or more imaging devices. In one example, the present system uses a photometric descriptor to describe one or more edges of minimum length within the field of view of the imaging device. In general, a straight image edge in a grayscale image may include a pixel patch that contains one dominant grayscale gradient direction. It is disjunct to an image corner, which has two dominant grayscale gradients, and it is disjunct to homogenous textures, which have none. In examples, the edges are straight edges, though it is conceivable that the edges defined and matched by the present technology may have a curve to them. These edges may be those of any of a variety of objects within the field of view, including for example walls, ceilings, bookshelves, furniture, etc.

Once an edge is identified within a field of view, it may be described using three parameters. A first is by an edge position and orientation vector $(x, y, \phi)$, where x, y denote the edge center in pixels, and $\phi \epsilon (0, 360°)$ is the orientation which is defined to point in the direction of the highest gradient. The second description of the edge is its length in pixels. This is a lower boundary estimate of an actual edge length, as parts of the edge may be occluded. The third description of the edge is made using an edge descriptor according to embodiments of the present technology. The edge descriptor may be a binary descriptor of length B for one dimensional grayscale image patches. These descriptions of an edge is explained in greater detail below.

Figure 1:
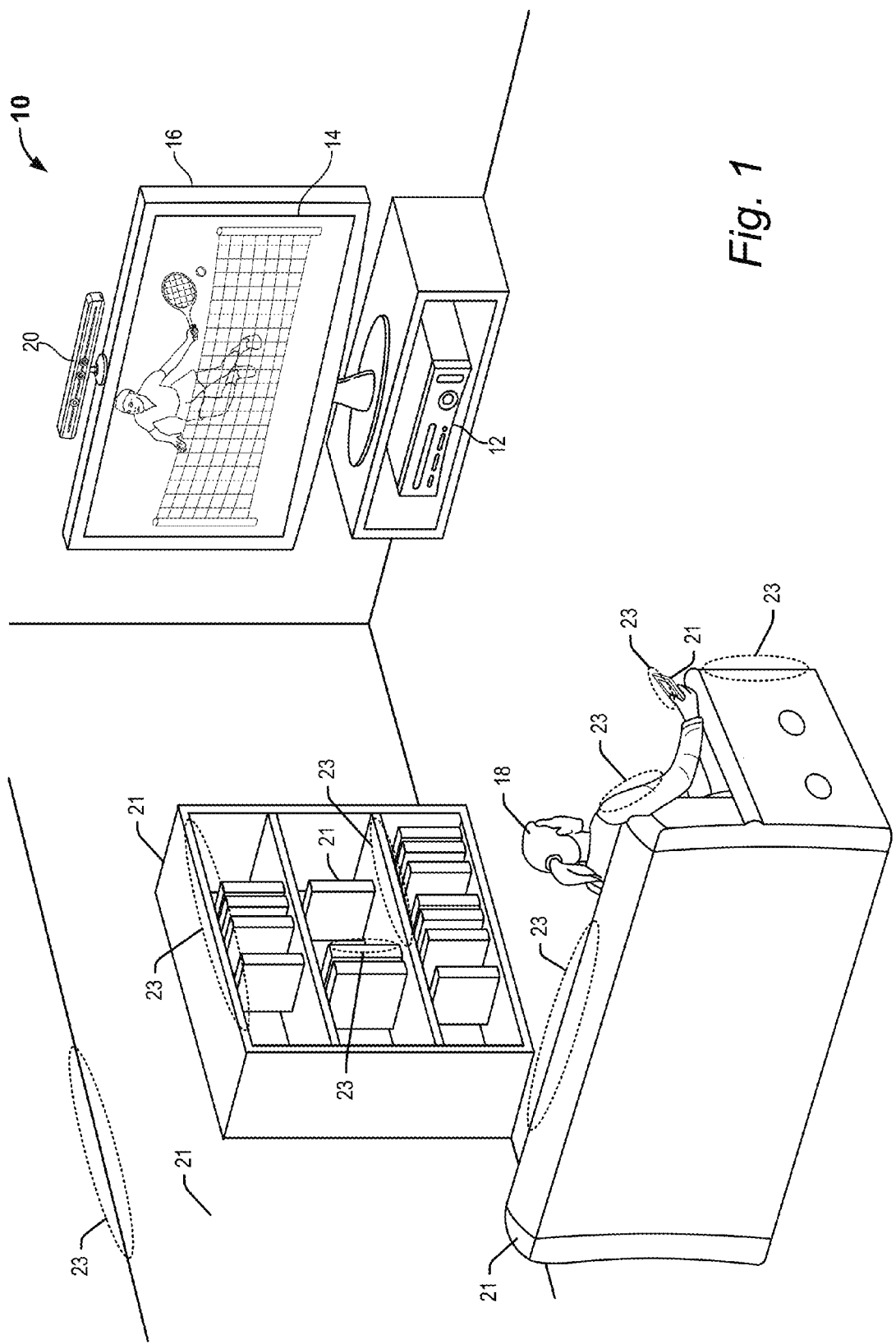
FIG. 1 illustrates an example embodiment of a system with an imaging device capturing a field of view.

The present technology may be implemented in a wide variety of photometric imaging systems. FIG. 1 illustrates one such system. In FIG. 1, the hardware for implementing the present technology includes a system 10 which may be used to recognize, analyze, and/or track edges, objects and/or human targets such as the user 18. Embodiments of the system 10 include a computing environment 12 for detecting and tracking edges. The system 10 may perform a variety of other functions, such as for example executing a gaming or other application. Although not critical to the present technology, the system 10 may further include an audiovisual device 16 for providing audio and visual representations from the gaming or other application. The system 10 further includes a capture device 20 for detecting edges and objects, as well as movement and gestures of a user, captured by the device 20.

As noted in the Background section, systems exist for detecting and tracking features having two dominant axes in a highly textured environment. Embodiments of the present system are capable of detecting and tracking edges in such environments, but also capable of detecting and tracking edges in low textured environments, and those where the edges are not part of features having two dominant axes. FIG. 1 illustrates a variety of objects 21 having edges 23 that may be detected and tracked according to the present technology. A variety of edges other than those shown may be defined in accordance with the present technology.

In general a field of view of the environment shown in FIG. 1 may be divided into an x, y, z Cartesian plane, with the z-axis emanating perpendicularly from a capture device 20 (explained below), and the x, y plane being perpendicular to the z-axis. The edges 23 which may be detected and tracked in accordance with the present technology may lie parallel to any of these x, y, z axes. Moreover, an edge 23 which may be detected and tracked in accordance with the present technology may lie at an oblique angle to one or more of the x, y, z axes. The edges 23 may be part of stationary, inanimate objects such as for example a couch, bookcase, books, handheld PDA and wall as shown. A wide variety of other inanimate objects may include edges which may be detected in accordance with the present technology. Edges 23 alternatively or additionally be part of a dynamic moving object, such as for example body parts of a user 18.

Figure 2:
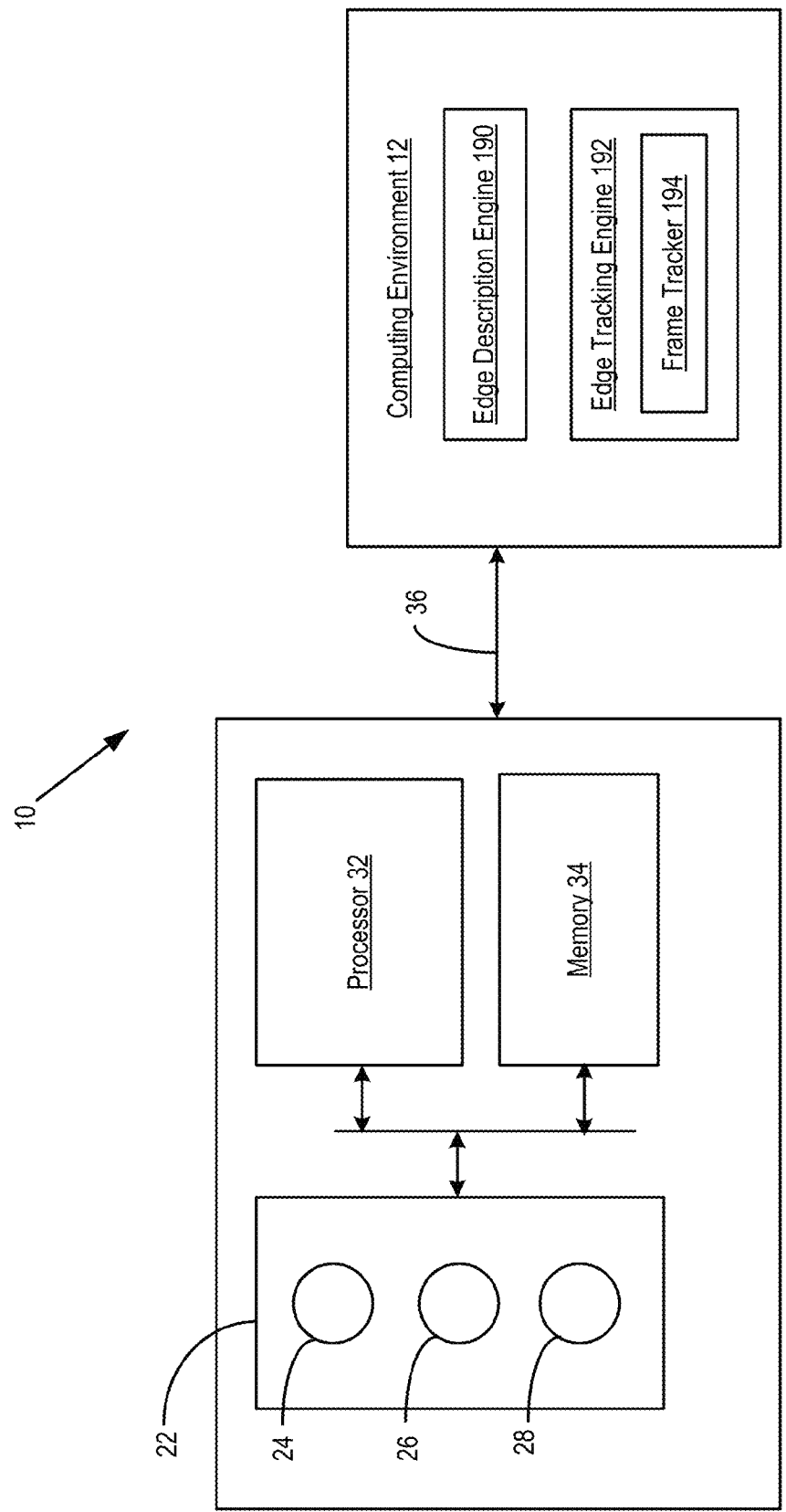
FIG. 2 illustrates an example embodiment of a capture device that may be used in a system of the present technology.
Figure 3:
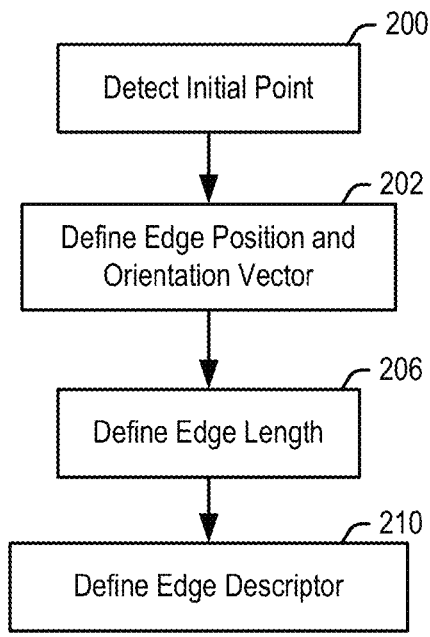
FIG. 3 is a high-level flowchart of the operation of the edge description engine according to an embodiment of the present technology.

FIG. 2 illustrates an example embodiment of the capture device 20 that may be used in the target recognition, analysis, and tracking system 10. Further details relating to a capture device for use with the present technology are set forth in co-pending patent application Ser. No. 12/475,308, entitled "Device For Identifying And Tracking Multiple Humans Over Time," which application is incorporated herein by reference in its entirety. However, in an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where pixels in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles. Embodiments of the present technology allow detection of the same edge by the two different imaging devices so that the views from the two imaging devices may be resolved together into a single depth map of the scene captured by the two devices.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22. As explained below, grayscale image data is captured for pixels along and identified edge, which grayscale image data is analyzed to accurately describe the edge. This grayscale image data may come from 3-D camera 26 and/or the RGB camera 28.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Computing environment 12 may further include edge description engine 190 capable of accurately describing an edge 23, and edge tracking engine 192 for tracking, or matching, an edge 23 from a current image to a subsequent image. The operation of edge description engine 190 will now be described in greater detail respect to the flowchart of FIG. 3, and the illustrations of FIGS. 4-11. Edge tracking engine 192 is described hereinafter.

In a step 200, the edge description engine 190 detects pixels defining an edge in the field of view. Various known interest point detection (IPD) algorithms may be used for high level detection of such points of interest within an edge. These algorithms can detect points generally defining an edge, but these algorithms are not capable of accurately describing an edge for the purposes of matching to that edge in later frames, or for the purposes of coordinating the views of multiple imaging devices. Steps for accurately describing the detected edge in accordance with the present technology are described below.

Step 200 detects characteristic points of interest in what is generally detected as an edge. Various algorithms may be used to detect an edge, such as for example by detecting a dominant grayscale gradient direction which has a predetermined length comprised of some minimum number of pixels. These algorithms also provide an orientation of the detected edge.

Figure 4:
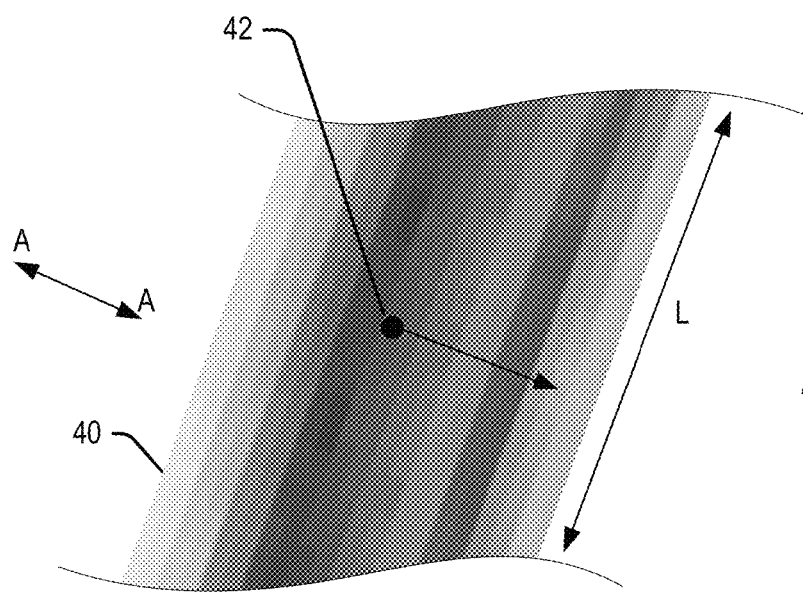
FIG. 4 illustrates an enlarged view of a sample edge captured by the imaging device of FIG. 1.
Figure 5:
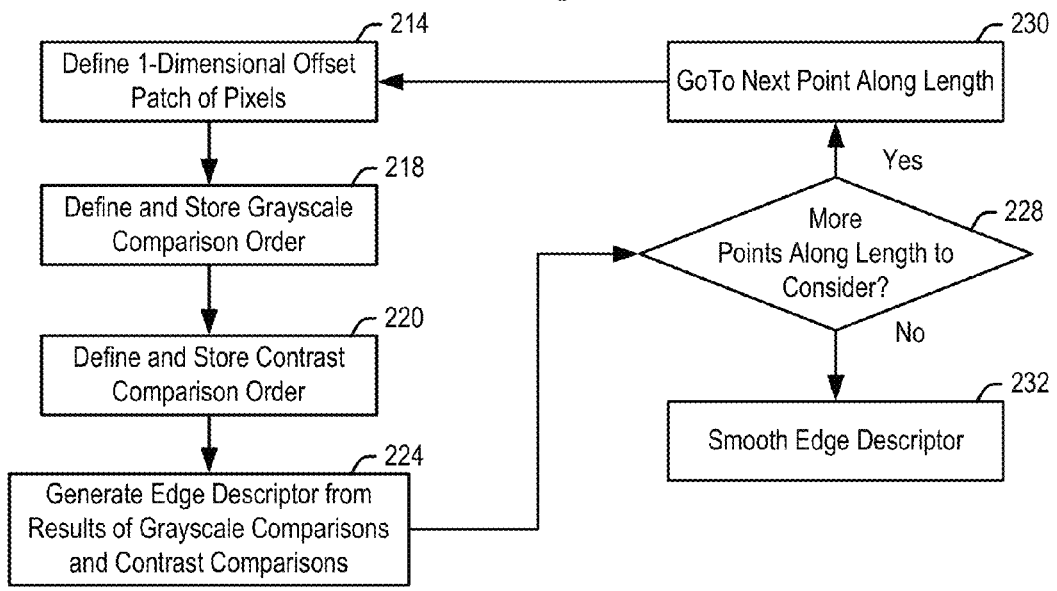
FIG. 5 is a flowchart of the operation of the edge description engine to determine an edge descriptor.

Once characteristic points of an edge identified in step 200, the edge description engine 190 describes the edge as set forth in steps 202 through 210. FIG. 4 shows at least a portion of a sample edge 40 as detected by capture device 20. Sample edge 40 may have a length, L, taken from any of the edges 23 shown for example in FIG. 1 and/or described above. As noted, sample edge 40 may be at any x, y, z position within the field of view of capture device 20. It is noted that the same edge may have more pixels where it is closer to the capture device 20 as compared to the same edge were it positioned further away. Similarly, the edge will have more pixels as the angle between the edge and viewing direction increases.

As noted above, an edge such as edge 40 may be selected because it has a length L of some pre-defined minimum number of pixels having a single dominant grayscale gradient direction. For example, in FIG. 4, the arrow A-A shows a single dominant grayscale gradient direction perpendicular to length L. In the length direction L, grayscale values of the pixels remains relatively constant.

In step 202, the edge description engine 190 defines an edge position and orientation vector 42. The edge position and orientation vector 42 may be defined by a 3-d vector (x, y, $\phi$), where x, y denote the edge center in pixels, and $\phi \in [0, 360°]$ is the 2-d orientation which is defined to point in the direction of highest grayscale gradient (either in the direction of increasing image intensity or decreasing image intensity). In general, this direction is across the width of the edge. This information may be determined from the IPD algorithm of step 200.

In step 204, the number of pixels along the edge (i.e., perpendicular to the edge position and orientation vector 42) may be determined. This is a lower boundary estimate of the actual length of edge 40, as portions of the edge 40 may be occluded.

In step 210, the edge description engine 190 may develop a binary edge descriptor for edge 40. In general, the edge descriptor for edge 40 provides a detailed binary description of the edge 40 which may be used to accurately identify the edge 40 in later image frames, or within the field of view of other image capture devices. Further details of the step 210 are set forth in the flowchart of FIG. 5 and the illustrations of FIGS. 6-11.

Figure 6:
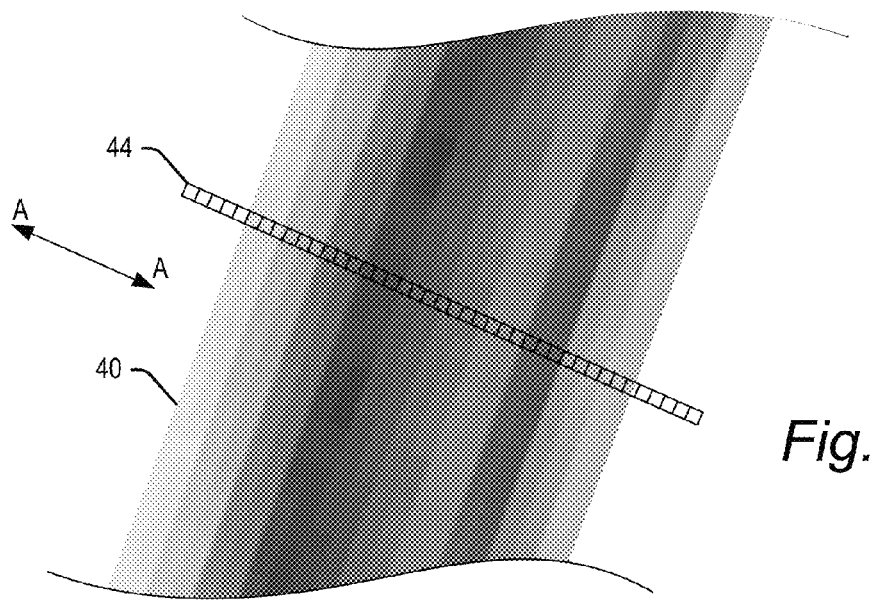
FIG. 6 illustrates an enlarged view of a sample edge including an offset patch of pixels according to embodiments of the present technology.

In step 214, an offset patch of pixels is defined which is centered on the point of interest, and which extends perpendicularly to the length L of edge 40. The initial point of interest may be the centered x, y point of the edge position and orientation vector 42 determined in step 202. As noted below, the point of interest may be moved along the length in subsequent determinations of edge descriptors for edge 40. FIG. 6 illustrates an example of an offset patch 44 capturing pixels across the edge 40. FIG. 7 is an enlarged illustration of the offset patch 44 from FIG. 6, including an indication of grayscale values in the pixels. It is understood that the edge 40 of FIG. 6, and the grayscale values in offset patch 44, are by way of example only and would vary depending on the edge 23 being examined from the field of view.

In embodiments, the offset patch 44 may have a number of pixels, S. In one embodiment, S=41 pixels, but it is understood that the offset patch 44 may be comprised of a greater or lesser number of pixels in further embodiments. In embodiments, the offset patch 44 may have an odd number of pixels so that it may be evenly centered across the width of edge 40. However, it is conceivable that the offset patch 44 have an even number of pixels in further embodiments.

As the grayscale image structure does not vary significantly along the length L of edge 40, an edge descriptor may be defined from a one-dimensional row of pixels, S×1, in the offset patch 44. Moreover, the orientation of the offset patch 44, perpendicular to the length L, causes the edge descriptor to yield the same response irrespective of the edge's orientation in the image. This allows the edge descriptor to be a rotation-invariant descriptor.

As described below, an edge descriptor may be developed from a comparison of individual offset pixel pairs in offset patch 44 under a predefined rule or rules. In embodiments, the edge descriptor may be a concatenation of two substrings. A first substring of the edge descriptor may be the results of a number of grayscale comparisons of pixel pairs in the offset patch 44. A second substring of the edge descriptor may be the results of a number of contrast comparisons of pixel pairs in the offset patch 44.

However, before those comparisons are performed, the order of comparisons may be established in steps 218 and 220. In step 218, the order of grayscale comparisons (which pixels from offset patch 44 are compared with each other for grayscale intensity) is defined and stored. Likewise, in step 220, the order of contrast comparisons (which pixels from offset patch 44 are compared with each other for contrast) is defined in stored. It is understood that the order of steps to 18 at 220 it reversed in further embodiments.

The order with which pixels within offset patch 44 are compared with each other in steps 218 and 220 may be randomly generated, pseudo-randomly generated or based on some ordering hierarchy. However the order is set, resulting established orders for the grayscale and contrast comparisons are stored in steps 218 and 219 so that the same order to be used in future matching operations of the feature descriptor, as explained below. The steps 218 and/or 220 may be performed prior to the definition of the offset patch in step 214 in further embodiments.

As described below, the result of the comparisons are stored in a bit of the binary edge descriptor. Accordingly, number of comparisons performed defines the length of the binary edge descriptor. A longer edge descriptor, such as for example 64 bits, will provide more detail regarding the definition of edge 40. A shorter edge descriptor, for example 32 bits, will allow for faster processing when comparing edge descriptors from subsequent images, and/or from one or more other imaging devices. Is understood that the edge descriptor may be shorter than 32 bits or longer than 64 bits in further embodiments.

In step 224, the edge descriptor is generated from the results of the grayscale comparisons and contrast comparisons. As noted above, a first substring of the edge descriptor is defined by the results of grayscale comparisons of pixels in the edge patch. The comparison of grayscale values may be as follows:

$$\text{bit no } i := \begin{cases} 1 & \text{if } g(o_{2i-1}) > g(o_{2i}) \\ 0 & \text{otherwise} \end{cases}, i \in \left\{1, \ldots, \frac{B}{2}\right\} \quad \text{(Eq. 1)}$$

where g(o) represents the grayscale value g in the patch 44 at offset (pixel) o, and B is the descriptor length.

FIG. 8 is a table showing some sample comparisons which may be performed in determining the grayscale substring of the edge detector. In step 218, in this example, an order of comparisons was established whereby pixel 38 was compared to pixel 17 for the first bit, pixel 6 was compared to pixel 30 for the second bit, pixel 14 was compared to pixel 1 for the third bit, pixel 14 was compared to pixel 40 for the fourth bit, and so on. As noted, the ordering of comparisons in FIG. 8 is by way of example only, and the comparison of any pixels from offset patch 44 may be performed in further embodiments. As shown, in one example, the same pixel may be used in multiple comparisons.

Referring to FIG. 7, the grayscale value of pixel 38 is not greater than the grayscale value of pixel 17 in this example of offset patch 44. Accordingly, the result of the comparison per Equation 1 is a "0" for the first bit. The grayscale value of pixel 6 is not greater than the grayscale value of pixel 30, so the result is "0" for the second bit. The grayscale value of pixel 14 is greater than the grayscale value of pixel 1, so the result is "1" for the third bit. These comparisons continue for the selected ordering of comparisons until the bits in the grayscale substring of the edge descriptor is set.

As noted above, a second substring of the edge descriptor is defined by the results of contrast comparisons of pixels in the edge patch. The comparison of contrast values may be as follows:

$$\text{bit no } i := \begin{cases} 1 & \text{if } |g(o_{2i-1}) > g(o_{2i})| < g_t \\ 0 & \text{otherwise} \end{cases}, \quad \text{(Eq. 2)}$$

$$i \in \left\{1, \ldots, \frac{B}{2}\right\}$$

The contrast threshold $g_t$ may be customized differently for different offset patches 44 to a fraction of the maximum grayscale value difference on that offset patch:

$$g_t = z \cdot (\max_i(g(o_i)) - \min_i(g(o_i))), i \in \{1, \ldots, B\} \quad \text{(Eq. 3)}$$

The constant $z \in (0, 1)$ may be set to a variety of different fractions, such as for example ⅓. Other contrast thresholds between 0 and 1 may be selected in further embodiments. Moreover, it is understood that the threshold may be predetermined for all offset patches, and not customized, in further embodiments.

FIG. 9 is a table showing some sample comparisons which may be performed in determining the contrast substring of the edge detector. In step 220, in this example, an order of comparisons was established whereby pixel 8 was compared to pixel 9 for the first bit in the contrast substring (the 16$^{th}$ bit in the edge descriptor in this example), pixel 39 was compared to pixel 30 for the second bit in the contrast substring, pixel 1 was compared to pixel 36 for the third bit in the contrast substring, pixel 17 was compared to pixel 5 for the fourth bit in the contrast substring, and so on. As noted, the ordering of comparisons in FIG. 9 is by way of example only, and comparison of any pixels from offset patch 44 may be performed in further embodiments. As shown, in one example, the same pixel may be used in multiple comparisons.

Referring to FIG. 7, the absolute value of the difference in contrast between pixels 8 and 9 is not less than the threshold $g_t$ in this example. Accordingly, the result of the comparison per Equation 2 is a "0" for the first bit in the contrast substring. The absolute value of the difference in contrast between pixels 39 and 30 is less than the threshold $g_t$ in this example, so the result of the comparison is a "1" for the second bit in the contrast substring. The absolute value of the difference in contrast between pixels 1 and 36 is not less than the threshold $g_t$ in this example, so the result of the comparison is a "0" for the third bit in the contrast substring. These comparisons continue for the selected ordering of comparisons until the bits in the contrast substring of the edge descriptor are set.

FIG. 10 shows a sample edge descriptor 50 established by the above-described comparisons. In this example, the number of bits, B, is 32. However, as noted above, the number of bits within the edge descriptor 50 may be more or less than 32. Edge descriptor 50 shown in FIG. 10 includes a grayscale comparison substring of length B/2, and a contrast comparison substring of length B/2. It is understood at the edge descriptor may be comprised differently in further embodiments. For example, the grayscale comparison substring of edge descriptor 50 be more than 50% of the edge descriptor 50, and in embodiments, the grayscale comparison substring may comprise all of the edge descriptor 50. Likewise, the contrast comparison substring of edge descriptor 50 may be more than 50% of the edge descriptor 50, and in embodiments, the contrast comparison substring may comprise all of the edge descriptor 50.

The edge descriptor 50 provides an accurate description of an edge, while at the same time being efficient with respect to processing time and resources. For example, using a binary descriptor allows comparison against like-computed edge descriptors 50 in subsequent images using a simple Hamming distance calculation, as explained below. This is more efficient than comparing floating point descriptors which use a Euclidean distance calculation. These and other features of the present technology allow feature descriptions and edge matching to take place in real time.

Figure 11:
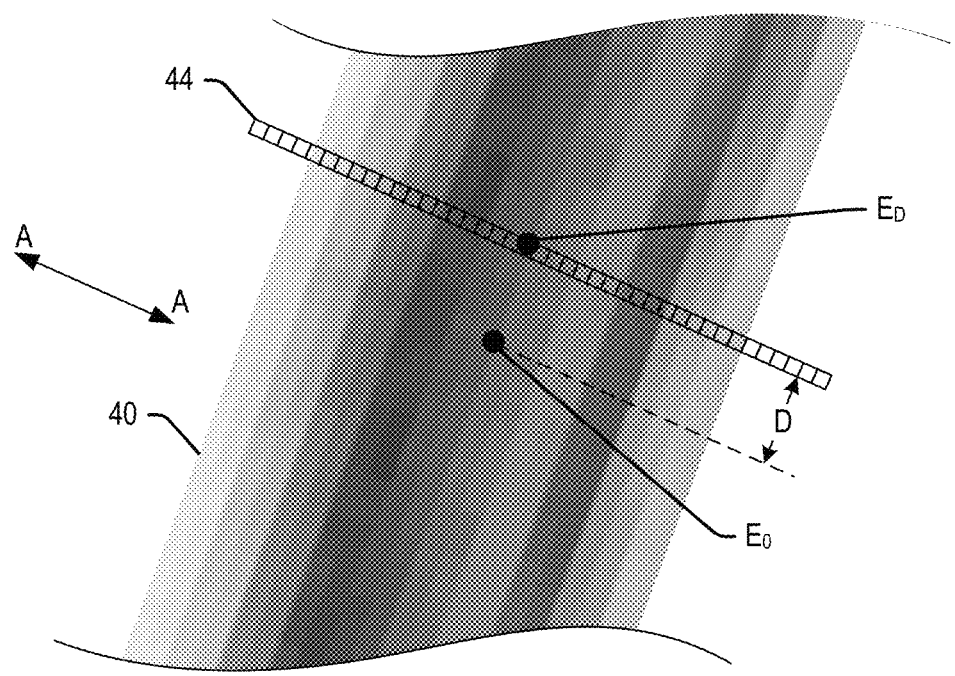
FIG. 11 illustrates an enlarged view of a sample edge showing determination of additional edge detectors along a length of the edge according to embodiments of the present technology.

Referring to FIG. 11, after calculation of the initial edge descriptor $E_0$ for the initial point of interest as described above, the edge description engine 190 may then define additional edge descriptors for additional points of interest along the length of edge 40. In particular, in step 228, the software engine 190 may determine whether there are additional points of interest along the length to consider. In the example illustrated in FIG. 11, the edge descriptor engine 190 may add a distance of D=d pixels along the edge 40 and calculate the new edge descriptor, $E_D$, at the new position. In embodiments, d may be 10 pixels, though it may be more or less pixels than that in further embodiments. Steps 214 and 224 are then repeated (using the same grayscale and contrast ordering as was originally determined and stored in steps 218 and 220). The offset patch 44 is defined at the new position as described above, and the new edge descriptor $E_D$ is determined at the new point of interest as described above.

The Hamming distance is then determined between $E_0$ and $E_D$. If the Hamming distance is smaller than some threshold t, $E_D$ is taken as $E_0$, a new point of interest is determined a distance D=d pixels further along the edge 40, and a new edge descriptor $E_D$ is determined at the new point of interest. In embodiments, the threshold Hamming difference may for example be t=B/5, though it is understood that other Hamming distances may be used as the threshold in further embodiments. The above steps are repeated until the Hamming distance exceeds the threshold t, at which point one end of the edge is considered to have been reached. The above steps are then repeated starting at the original $E_0$ in the opposite direction until the opposite edge is reached. At that juncture, there are no further points to consider in step 228.

After all edge descriptors 50 have been determined for edge 40 as described above in step 228, the edge description engine 190 may next smooth the edge descriptors to arrive at a final edge descriptor $E_F$ in step 232. The smoothing function may operate by sampling the edge descriptors $E_1, \ldots, E_K$ at K random interest points. The binarized average over this descriptor set defines the final edge descriptor $E_F$ for the image edge:

$$\text{bit no } i := \left\lceil \frac{1}{K} \sum_{k=1}^{K} E_k(i) \right\rceil, i \in \{1, \ldots, B\}, \quad \text{(Eq. 4)}$$

where $E_K(i)$ denotes the bit number i in the descriptor $E_K$.

The above sets forth how to generate edge descriptors 50 for describing one or more edges in a field of view of a capture device 20. These edge descriptors 50 may be used in at least two scenarios. First, where a single capture device 20 is used to capture a field of view in successive image frames, the one or more edge descriptors defined in a first image frame may be used to identify the same edges in subsequent image frames. Second, where multiple capture devices 20 are used to capture a single scene, the one or more edge descriptors defined for the image captured by first capture device 20 may be matched with one or more edge descriptors defined for the image captured by the second or subsequent capture device 20.

Figure 12:
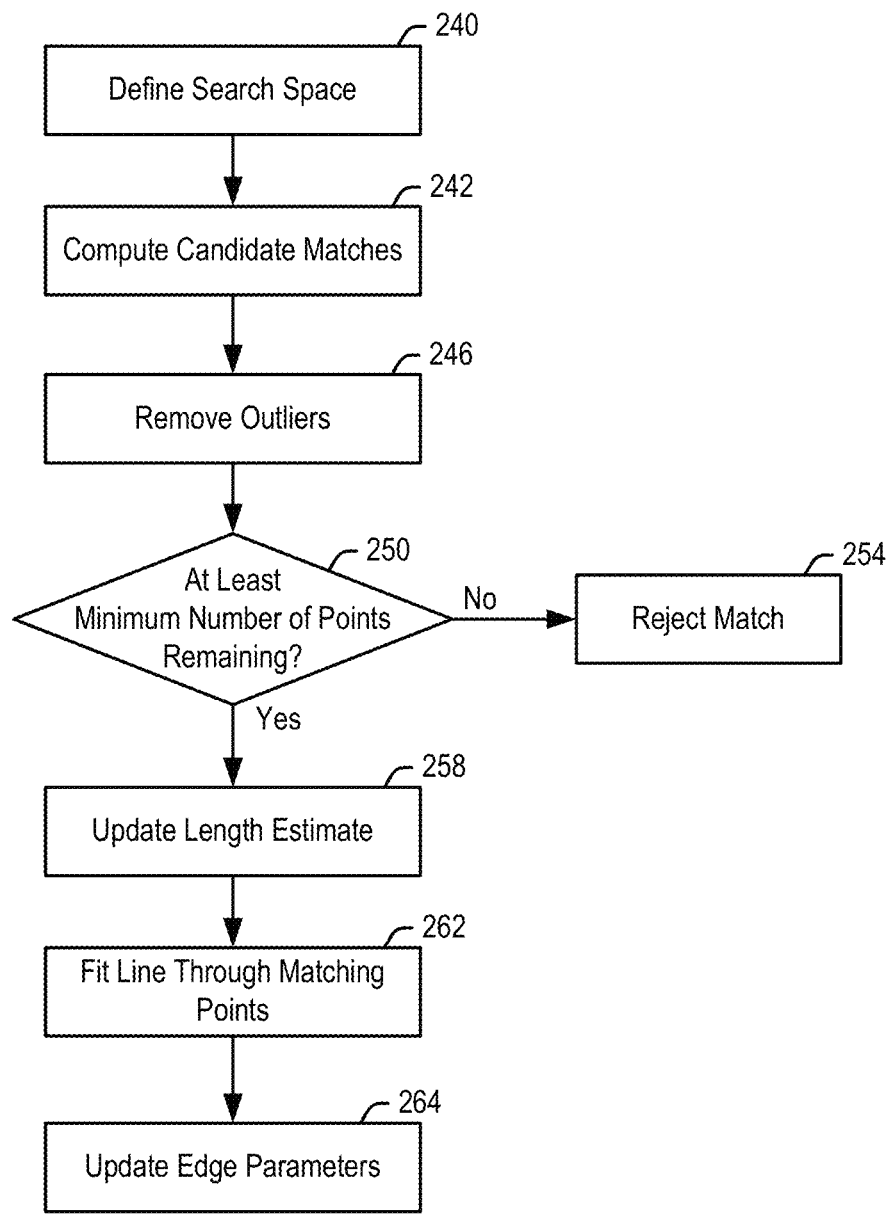
FIG. 12 is a flowchart of the operation of the edge matching engine according to embodiments of the present technology.

FIG. 12 and the illustrations of FIGS. 13-16 describe the operation of the edge matching engine 192 for matching edges in either of the above-described scenarios. As used in the following description, the term "subsequent image" refers to a subsequent image frame captured by a capture device, or an image frame from another capture device.

In step 240, a search space is defined in the subsequent image by generating a rough hypothesis as to the pose (position and orientation) of the edge in the subsequent image. The rough pose hypothesis (also referred to as the proposed edge) may be generated by a frame tracker 194 (FIG. 2) of the edge matching engine 192. The frame tracker may examine one or more prior frames of data in which the edge has been identified to get an estimation of its movement and pose in the subsequent image.

Figure 13:
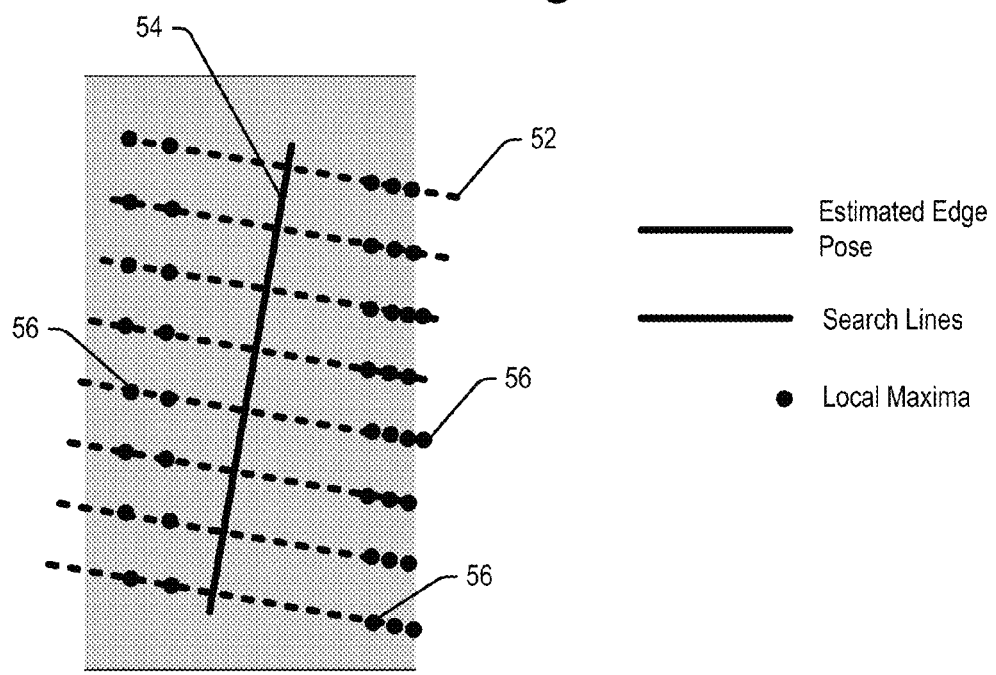
FIGS. 13-16 are illustrations of how the edge matching engine matches an edge from the initial image to edges in subsequent image according to embodiments of the present technology.

The definition of the search space from the rough pose hypothesis in step 240 will now be described with reference to the illustration of FIG. 13. A number of search lines 52 (one of which is numbered in FIG. 13) are defined which may be centered around and extend perpendicularly from the rough edge pose hypothesis 54. The search lines 52 may be spaced equally from each other along the edge pose hypothesis 54. The number of search line 52 may vary in embodiments, but where the length of the edge pose hypothesis 54 is longer than 30 pixels, there may be ten equally spaced search lines 52. Where the edge pose hypothesis 54 is shorter than 30 pixels, there may be less than ten search lines 52, such as for example three search lines in one embodiment. The maximum estimation error of the edge pose hypothesis may be given by the frame tracker 194. The length of the search lines 52 can be set using this maximum estimation error.

To reduce the search space further, the edge tracking engine 192 may use an oriented finite difference gradient filter, the orientation being set to the proposed edge orientation. It produces local maxima 56 (some of which are numbered) on the search lines 52 for gradient pixels orientated similarly to the posed edge 54. The union of all points of local maxima 56 on all search lines 52 may define the search space.

Figure 14:
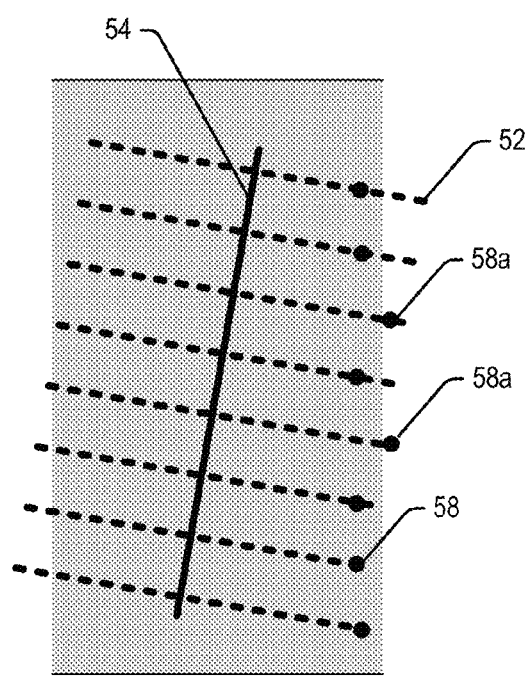

In step 242, the edge tracking engine 192 may compute candidate edge descriptors as matches to the edge descriptor $E_F$ for the edge determined from the earlier image. In particular, edge descriptors may be determined by the edge description engine 190 as described above for all points in the search space. The same, stored grayscale and contrast orderings may be used in this step. For the search lines, the edge descriptor having a minimum Hamming distance relative to the final edge descriptor $E_F$ is maintained. Thus, as shown in FIG. 14, the search lines 52 may have a single point 58 (some of which are numbered in the figure) whose edge descriptor most closely resembles the edge descriptor $E_F$. The other candidates may be discarded.

Figure 15:
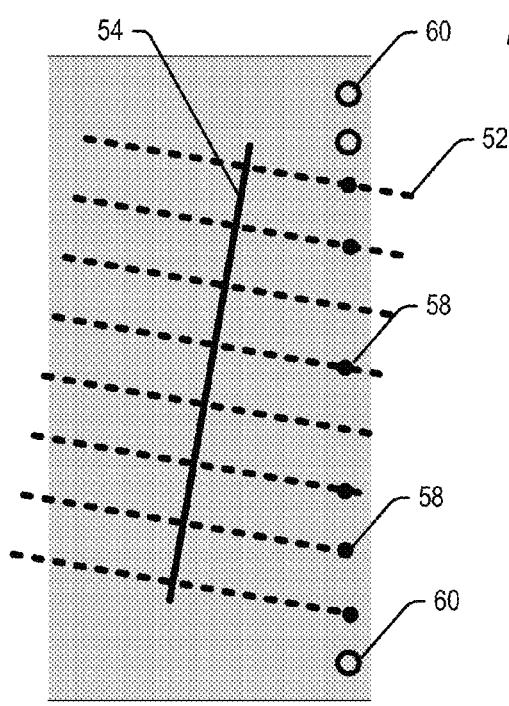

In step 246, outlier points 58 may be identified and discarded. In particular, the set of candidate points 58 identified as matches might contain outliers, such as points 58a in FIG. 14. These outliers may be identified and removed in a procedure similar to a Hough transform feature extraction technique. However, taking advantage of the fact that the orientation of the matches are known (they were all detected by the same oriented finite difference filter described above), the Hough space can be reduced from two dimensions (i.e. radial distance and orientation) to one (radial distance). As such, the process used in the present technology may be faster than a traditional Hough transform feature extraction. In the applied transform, the matches vote for one distance bin in the accumulator array. The latter may be coarsely discretized into distance bins of 15 pixels (though some other number of pixels may be used in further embodiments). Once the accumulator array is filled, any matches falling outside the bin with the maximum number of votes and its two adjacent bins are treated as outliers (58a) and discarded, as shown in FIG. 15.

In step 250, the edge tracking engine 192 determines if the number of candidate match points 58 after outlier removal is above some predetermined minimum. In embodiments, the predetermined minimum may be three or greater. If the number of candidate matches after outlier removal is less than the predetermined minimum, no match with the proposed edge 54 is considered to have been found for this subsequent image. On the other hand, if the number of candidate matches after outlier removal is greater than the predetermined minimum, all remaining matches are confirmed.

Thereafter, in steps 258, 262 and 264 the edge parameters may be updated for the edge matched in this subsequent frame. In particular, in step 258, the edge length may be updated. As noted above, the initial length of the edge might have been underestimated due to occlusion in the original image. Starting from the two outermost points on the edge, the edge may be extended, for example using the methods described above with respect to steps 228 and 230. Newly found matches, such as points 60 in FIG. 15 are added to the set of matches.

Figure 16:
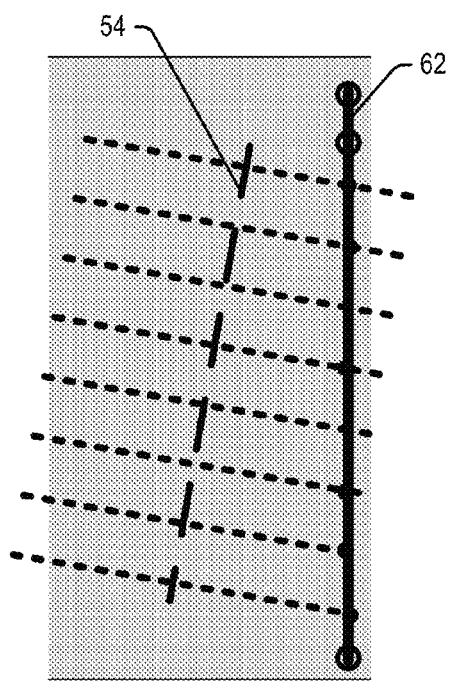

In step 262, the pose estimate may be updated by fitting a line through the matching points as shown by line 62 in FIG. 16. In one example, the pose estimate for the edge in the subsequent image may be updated using simple least squares to fit a line through the set of matching points. Since outliers have been removed previously, no costly robust fitting method has to be applied. If the mean residual exceeds a threshold, the edge match may be rejected. Otherwise the edge pose and length from the original image are updated in step 264 to match the center point, orientation, and length of the fitted line 62 in FIG. 16.

Figure 17:
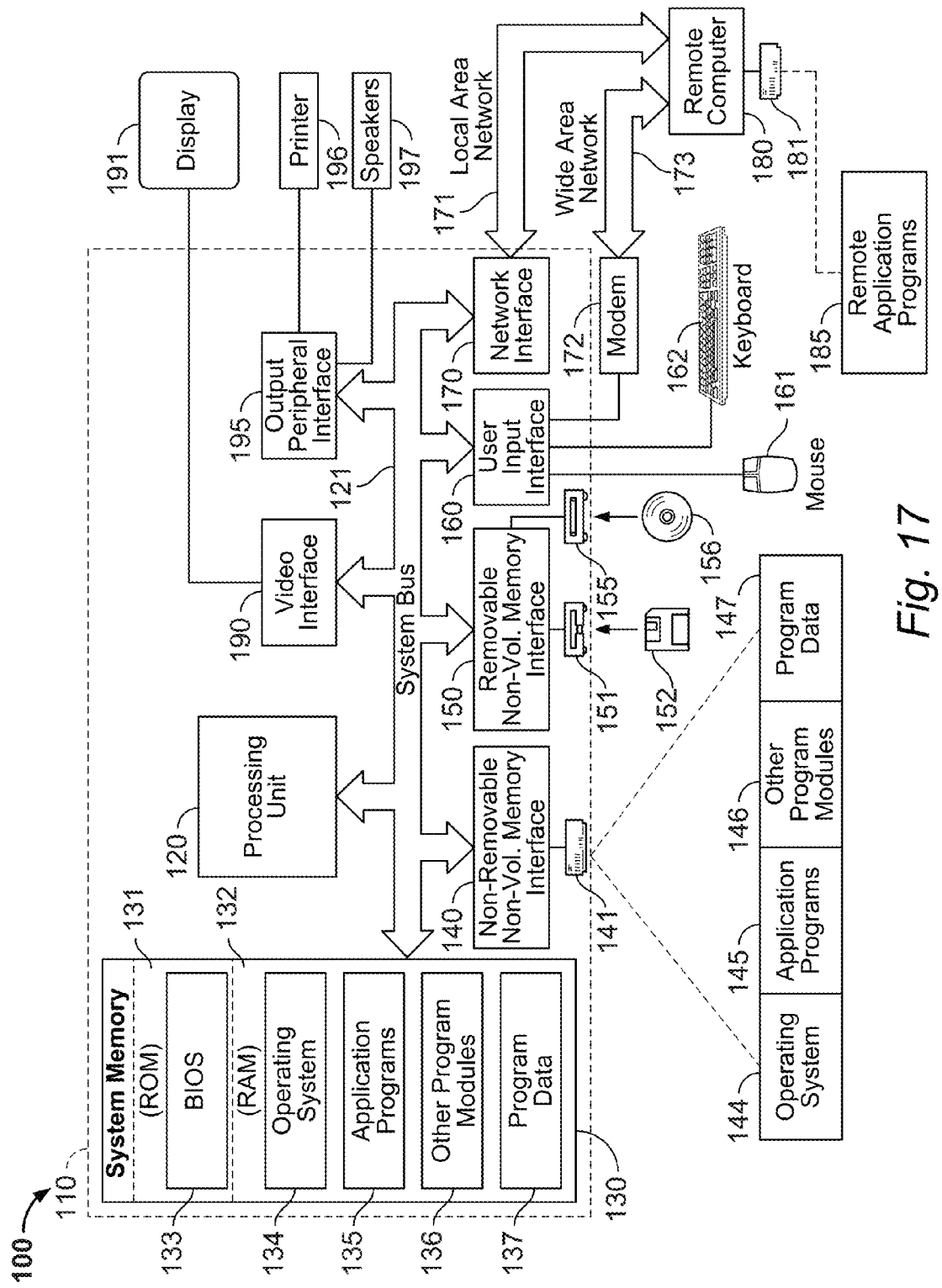
FIG. 17 illustrates an example embodiment of a computing environment may be used to generate edge descriptors in embodiments of the present technology.

The methods described herein can be performed on a variety of processing systems. FIG. 17 illustrates an example of a suitable general computing system environment 100 for carrying out the methods of the present system. The computing system environment 100 is only one example of a suitable computing environment and is not intended to suggest any limitation as to the scope of use or functionality of the present technology. Neither would the computing system environment 100 be interpreted as having any dependency or requirement relating to any one or combination of components illustrated in the exemplary computing system environment 100.

The present technology is operational with numerous other general purpose or special purpose computing systems, environments or configurations. Examples of well known computing systems, environments and/or configurations that may be suitable for use with the present technology include, but are not limited to, personal computers, server computers, multiprocessor systems, microprocessor-based systems, set top boxes, programmable consumer electronics, network PCs, minicomputers, mainframe computers, laptop and palm computers, smart phones and other hand held devices, distributed computing environments that include any of the above systems or devices, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer storage media including memory storage devices.

With reference to FIG. 17, an exemplary system for implementing the present technology includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory, read only memory, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the information and which can be accessed by computer 110. Communication media typically embodies computer readable instructions, data structures or program modules.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 17 illustrates operating system 134, application programs 135, other program modules 136, and program data 137.

The computer 110 may also include other removable/non-removable, volatile/nonvolatile computer storage media. By way of example only, FIG. 17 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 17, provide storage of computer readable instructions, data structures, program modules and other data for the computer 110. In FIG. 17, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although a memory storage device 181 has been illustrated in FIG. 17. The logical connections depicted in FIG. 17 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 17 illustrates remote application programs 185 as residing on memory device 181. It will be appreciated that the network connections shown are exemplary and other means of establishing a communications link between the computers may be used.

The foregoing detailed description of the present technology has been presented for purposes of illustration and description. It is not intended to be exhaustive or to limit the present technology to the precise form disclosed. Many modifications and variations are possible in light of the above teaching. The described embodiments were chosen in order to best explain the principles of the present technology and its practical application to thereby enable others skilled in the art to best utilize the present technology in various embodiments and with various modifications as are suited to the particular use contemplated. It is intended that the scope of the present technology be defined by the claims appended hereto.

We claim:

1. A photometric system for describing an edge within a field of view, comprising:
    an offset patch of pixels in an image, the offset patch of pixels taken across a width of the edge, the patch having a single row of a predetermined number of pixels; and
    a binary edge descriptor determined by comparing pixel pairs within the offset patch under a predetermined rule comparing at least one of greyscale and contrast of one or more pixel pairs in the offset patch of pixels, the result of the comparisons under the predetermined rule setting bits within the binary descriptor.

2. The system of claim 1, wherein edge descriptor is rotation-invariant.

3. The system of claim 1, wherein the predetermined rule compares the grayscale values of pixel pairs in the offset patch.

4. The system of claim 3, wherein the pixel pairs selected for comparison are selected by a random, pseudo-random or ordered process.

5. The system of claim 1, wherein the predetermined rule compares contrast of pixel pairs by taking a difference in grayscale values of pixel pairs in the offset patch against a threshold value.

6. The system of claim 5, wherein the pixel pairs selected for comparison are selected by a random, pseudo-random or ordered process.

7. The system of claim 1, wherein the predetermined rule compares the grayscale values of pixel pairs in the offset patch and compares contrast of pixel pairs by taking a difference in grayscale values of pixel pairs in the offset patch against a threshold value.

8. The system of claim 1, wherein the binary edge descriptor is a 32 bit or 64 bit number.

9. The system of claim 1, wherein the binary edge descriptor comprises a first binary edge descriptor, the system further comprising a plurality of additional binary edge descriptors taken at different positions along a length of the edge, the plurality of additional binary edge descriptors determined in the same manner as the first binary edge descriptor.

10. The system of claim 9, the first binary edge descriptor and the plurality of additional binary edge descriptors smoothed to provide a final edge descriptor for the edge.

11. A method of describing an edge captured within a field of view of an imaging device, the method comprising:
    (a) determining a point of interest on the edge from an image of the edge;
    (b) determining an orientation of the edge from the image;
    (c) identifying a row of pixels from the image through the point of interest and oriented across a width of the edge;
    (d) comparing at least one of greyscale properties and contrast properties of different pixel pairs within the row of pixels identified in the step (c); and
    (e) setting the bits of a binary descriptor based on the result of the comparisons performed in said step (d).

12. The method of claim 11, said step (d) comprising the step of comparing grayscale values of pixels in respective pixel pairs to determine which pixel of a pair has a higher grayscale value.

13. The method of claim 12, said step (d) further comprising the step of comparing contrast of pixels in respective pixel pairs against a threshold to determine whether pixels in respective pixel pairs have a contrast higher than the threshold.

14. The method of claim 13, wherein the threshold is customized based on the grayscale values of the row of pixels identified in the step (c).

15. The method of claim 11, further comprising the steps of repeating steps (a) through (e) to define additional edge descriptors for different points of interest along a length of the edge.

16. The method of claim 15, a last point of interest along the length being identified when the Hamming distance between the edge descriptor for the last point and the edge descriptor for the initial point of interest exceeds a predetermined value.

17. A method of matching an edge within first and second images, the method comprising:
   (a) describing the edge from the first image by the steps of:
      (i) defining an offset patch of pixels taken across a width of the edge, the patch having a single row of a predetermined number of pixels, and
      (ii) defining a binary edge descriptor by comparing at least one of grayscale values and contrast of pixels within respective pixel pairs within the offset patch, the result of the comparisons setting bits within the binary descriptor; and
   (b) matching the edge from the first image with the edge of the second image by the steps of:
      (i) computing binary edge descriptors for points of interest on a proposed edge in the second image,
      (ii) confirming the proposed edge in the second image as matching the edge in the first image where the Hamming distance between the edge descriptors for the points of interest on the proposed edge in the second image and the edge descriptor for the edge in the first image is below a predetermined value.

18. The method of claim 17, wherein the first and second images are from a single image capture device captured at different times.

19. The method of claim 17, wherein the first and second images are from first and second image capture devices capturing a single scene.

20. The method of claim 17, wherein the describing and matching steps take place in real time.

* * * * *